(12) United States Patent  (10) Patent No.: US 8,537,427 B2
Fujishiro  (45) Date of Patent: Sep. 17, 2013

(54) METHOD OF ADJUSTING LINE DATA AND IMAGE FORMING APPARATUS

(75) Inventor: Wataru Fujishiro, Anjo (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 300 days.

(21) Appl. No.: 13/036,518

(22) Filed: Feb. 28, 2011

(65) Prior Publication Data

US 2011/0292452 A1  Dec. 1, 2011

(30) Foreign Application Priority Data

May 27, 2010  (JP) ................................. 2010-121920

(51) Int. Cl.
*H04N 1/407* (2006.01)
(52) U.S. Cl.
USPC .......................... 358/3.27; 358/1.9; 358/3.26
(58) Field of Classification Search
None
See application file for complete search history.

(56) References Cited

U.S. PATENT DOCUMENTS

| | | | | | |
|---|---|---|---|---|---|
| 4,703,323 | A | * | 10/1987 | Troupes et al. | ............... 345/561 |
| 7,355,744 | B2 | * | 4/2008 | Hattori | ............................ 358/1.2 |
| 2002/0039444 | A1 | | 4/2002 | Yamagata et al. | |
| 2004/0051902 | A1 | | 3/2004 | Sasaki | |
| 2006/0098232 | A1 | * | 5/2006 | Nakano et al. | ............... 358/3.26 |
| 2006/0285163 | A1 | * | 12/2006 | Han et al. | ..................... 358/1.18 |
| 2008/0304108 | A1 | * | 12/2008 | Kimura | ........................ 358/3.27 |

FOREIGN PATENT DOCUMENTS

| | | |
|---|---|---|
| JP | 11-85978 | 3/1999 |
| JP | 2000-69284 | 3/2000 |
| JP | 2001-45299 | 2/2001 |
| JP | 2001-341357 | 12/2001 |

* cited by examiner

*Primary Examiner* — Dung Tran

(74) *Attorney, Agent, or Firm* — Scully, Scott, Murphy & Presser, P.C.

(57) ABSTRACT

A method of adjusting line data is provided, where a dot pattern for one line is represented by dot data indicative of dot formation and blank data indicative of no dot formation. The method includes: determining whether X or more blank data are arranged consecutively, the X or more blank data including adjacent blank data adjacent to dot data on at least one side of the dot data, where X is an integer greater than or equal to one ($X \geq 1$); and converting Y consecutive blank data including the adjacent blank data into dot data if it is determined that the X or more blank data are arranged consecutively in the determining step, where Y is an integer greater than or equal to one and less than or equal to X ($X \geq Y \geq 1$).

19 Claims, 12 Drawing Sheets

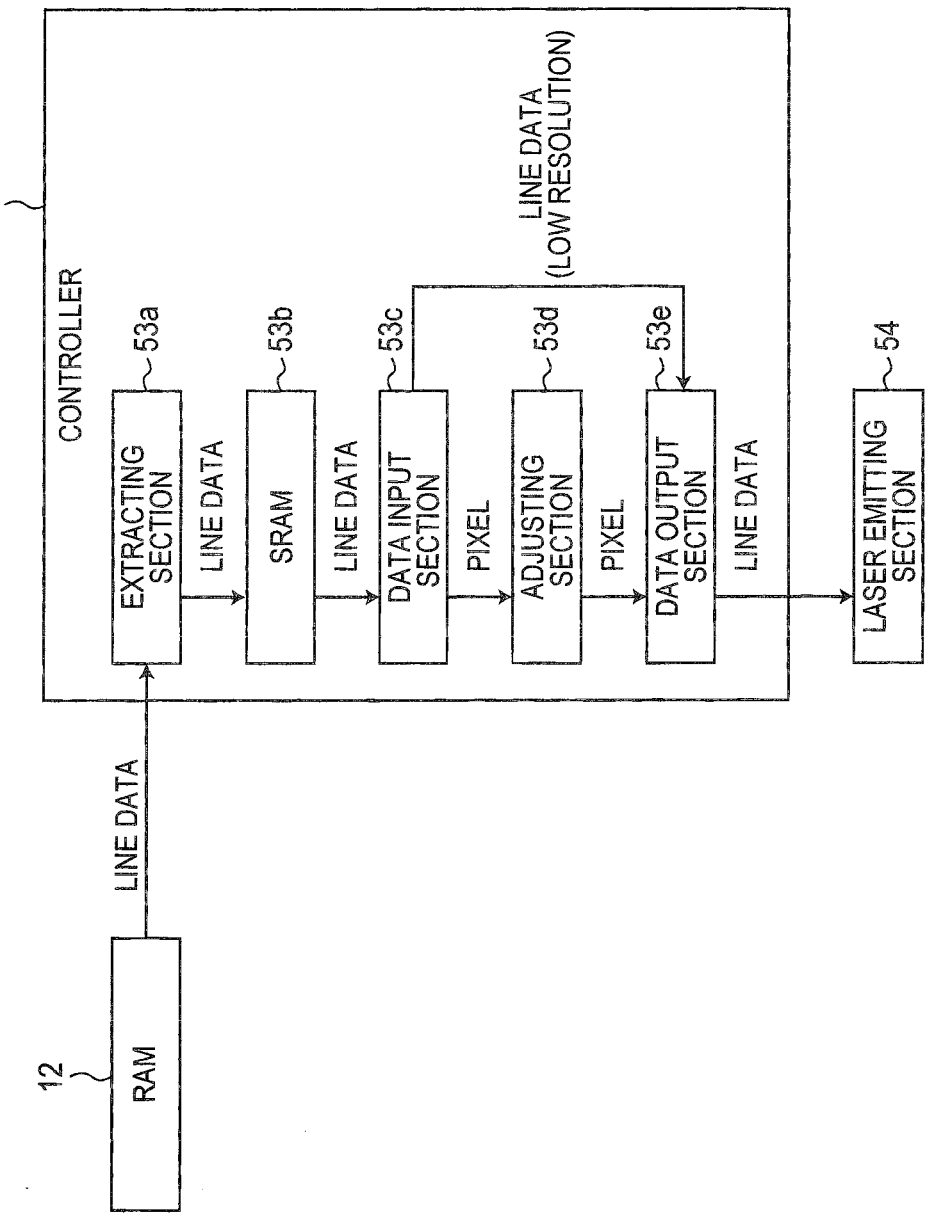

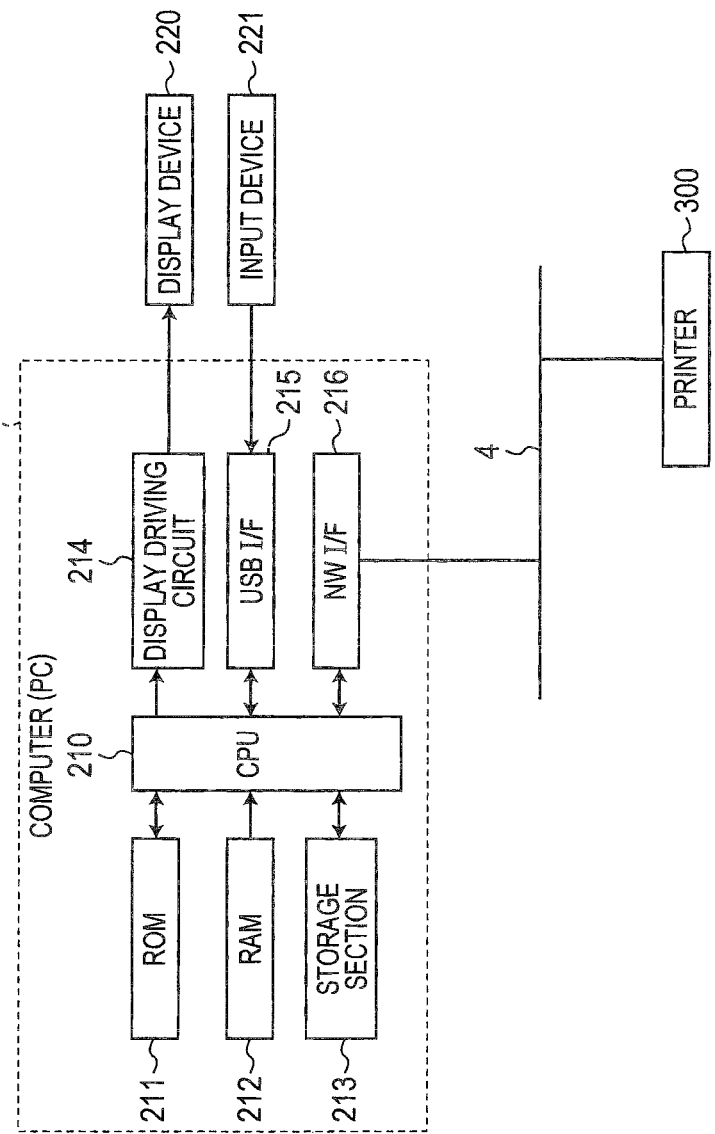

METHOD OF ADJUSTING LINE DATA AND IMAGE FORMING APPARATUS

CROSS REFERENCE TO RELATED APPLICATIONS

This application claims priority from Japanese Patent Application No. 2010-121920 filed May 27, 2010. The entire content of the priority application is incorporated herein by reference.

TECHNICAL FIELD

The invention relates to a method of adjusting line data and an image forming apparatus.

BACKGROUND

An image forming apparatus of an electro-photographic type forms dots of toner on a recording medium, based on line data representing a dot pattern for one line by dot data (for example, one) indicative of dot formation and blank data (for example, zero) indicative of no dot formation, and repeats this process for all the lines for forming an image.

In such an image forming apparatus of the electro-photographic type, it is known to adjust video data (line data) for suppressing jaggy of contour lines.

SUMMARY

However, the conventional image forming apparatus adjusts line data for suppressing jaggy, and it is not taken into account to adjust line data so as to facilitate adhesion of toner on a recording medium.

In view of the foregoing, it is an object of the invention to provide a method of adjusting line data and an image forming apparatus for adjusting line data so as to facilitate adhesion of toner on a recording medium, while suppressing a substantial change from an original image quality.

In order to attain the above and other objects, the invention provides a method of adjusting line data, where a dot pattern for one line is represented by dot data indicative of dot formation and blank data indicative of no dot formation. The method includes: determining whether X or more blank data are arranged consecutively, the X or more blank data including adjacent blank data adjacent to dot data on at least one side of the dot data, where X is an integer greater than or equal to one ($X \geq 1$); and converting Y consecutive blank data including the adjacent blank data into dot data if it is determined that the X or more blank data are arranged consecutively in the determining step, where Y is an integer greater than or equal to one and less than or equal to X ($X \geq Y \geq 1$).

According to another aspect, the invention also provides an image forming apparatus. The image forming apparatus forms dots of toner on a recording medium, based on line data representing a dot pattern for one line by dot data indicative of dot formation and blank data indicative of no dot formation. The image forming apparatus includes a determining section and a converting section. The determining section determines whether X or more blank data are arranged consecutively, the X or more blank data including adjacent blank data adjacent to dot data on at least one side of the dot data, where X is an integer greater than or equal to one ($X \geq 1$). The converting section converts Y consecutive blank data including the adjacent blank data into dot data if the determining section determines that the X or more blank data are arranged consecutively, where Y is an integer greater than or equal to one and less than or equal to X ($X \geq Y \geq 1$).

According to still another aspect, the invention also provides a processing device. The processing device processes image data for forming dots of toner on a recording medium, based on line data representing a dot pattern for one line by dot data indicative of dot formation and blank data indicative of no dot formation. The processing device includes a determining section and a converting section. The determining section determines whether X or more blank data are arranged consecutively, the X or more blank data including adjacent blank data adjacent to dot data on at least one side of the dot data, where X is an integer greater than or equal to one ($X \geq 1$). The converting section converts Y consecutive blank data including the adjacent blank data into dot data if the determining section determines that the X or more blank data are arranged consecutively, where Y is an integer greater than or equal to one and less than or equal to X ($X \geq Y \geq 1$).

Note that each function of the sections of the invention can be implemented by a hardware of which the function is identified by its structure, a hardware of which the function is identified by one or more programs, or a combination thereof. Further, each function of these sections is not limited to a function that is implemented by physically independent hardware.

BRIEF DESCRIPTION OF THE DRAWINGS

Embodiments in accordance with the invention will be described in detail with reference to the following figures wherein:

FIG. 4 is a block diagram showing the configuration of a controller;

FIG. 12 is a block diagram showing the electrical configuration of a computer according to a third embodiment.

DETAILED DESCRIPTION

<First Embodiment>

A method of adjusting (correcting) line data and an image forming apparatus according to a first embodiment of the invention will be described while referring to FIGS. 1 through 8. The image forming apparatus of the first embodiment is applied to a laser printer 1 (an example of an image forming apparatus, and hereinafter referred to as "printer").

(1) Configuration of Laser Printer

Figure 1:
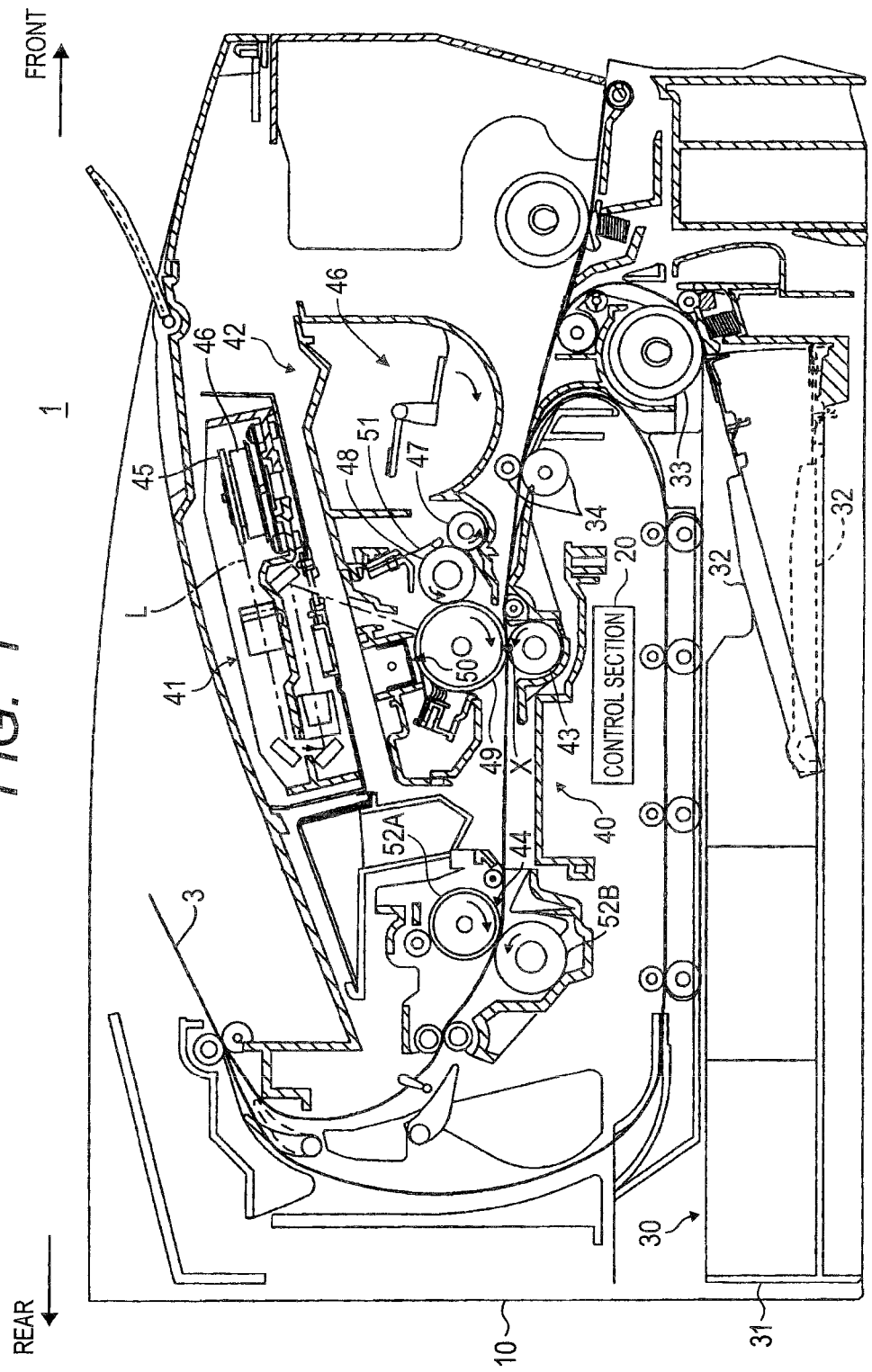
FIG. 1 is a vertical cross-sectional view of the relevant parts of a laser printer according to a first embodiment of the invention.

As shown in FIG. 1, the printer 1 according to the first embodiment includes a main case 10, a control section 20, a feeder section 30, an image forming section 40, and the like.

The control section 20 includes a CPU, a ROM, a RAM 12 (see FIG. 4), and the like, and controls each section of the printer 1.

The feeder section 30 includes a paper supplying tray 31, a paper pressing plate 32, a paper supplying roller 33, a pair of registration rollers 34, and the like. The paper pressing plate 32 is swingably supported at its rear end, and paper 3 (an example of a recording medium) at the uppermost position on the paper pressing plate 32 is pressed against the paper supplying roller 33.

The paper 3 is supplied one sheet at a time by rotation of the paper supplying roller 33, subjected to registration by the registration rollers 34, and subsequently sent to a transfer position X. The transfer position X is a position at which a toner image on a photosensitive drum 49 is transferred to the paper 3 and at which the photosensitive drum 49 and a transfer roller 43 are in confrontation with each other.

The image forming section 40 includes a scanner section 41, a process cartridge 42, the transfer roller 43, and a fixing section 44.

The scanner section 41 includes a laser emitting section 54 (see FIG. 4), a controller 53 (see FIG. 4) that outputs line data to the laser emitting section 54, a polygon mirror 45, a motor 46 that rotatably drives the polygon mirror 45, and the like. Laser light (single-dot chain lines in FIG. 1) emitted from the laser emitting section 54 is deflected by the rotating polygon mirror 45, and is irradiated onto the surface of the photosensitive drum 49.

The process cartridge 42 includes a tonner accommodating chamber 46, a supply roller 47, a developing roller 48, the photosensitive drum 49, a charger 50, and a layer-thickness regulating blade 51.

The tonner accommodating chamber 46 accommodates positively-charged nonmagnetic polymer toner.

The charger 50 is a Scorotron-type charger, for example, and charges the surface of the photosensitive drum 49 uniformly to positive polarity. Subsequently, the surface of the photosensitive drum 49 is exposed to laser light from the scanner section 41 so that an electrostatic latent image is formed.

Toner accommodated in the tonner accommodating chamber 46 is supplied to the supply roller 47, and is further supplied to the developing roller 48 by rotation of the supply roller 47. The toner supplied to the developing roller 48 enters between the layer-thickness regulating blade 51 and the developing roller 48 with rotation of the developing roller 48, and is borne on the developing roller 48 as a thin layer of a uniform thickness.

After that, toner borne on the surface of the developing roller 48 is supplied to the electrostatic latent image on the photosensitive drum 49 by a potential difference, so that a toner image is formed on the photosensitive drum 49. The toner image formed on the photosensitive drum 49 is attracted by the transfer roller 43 applied with negative voltage, and adheres to the paper 3.

The fixing section 44 includes a heat roller 52A and a pressure roller 52B, where the pressure roller 52B presses the paper 3 against the heat roller 52A so that toner is thermally fixed to the paper 3.

Further, the printer 1 also includes a communication interface (not shown) for communicating with an external device such as a personal computer.

(2) Line Data

The external device is connected to the printer 1 so as to be capable of communicating with the printer 1. The external device generates halftone data based on a page to be printed, compresses the generated halftone data, and transmits the compressed data to the printer 1. Halftone data are binary (two-valued) data for representing a dot pattern to be formed on the paper 3 by one (1: dot data) indicative of dot formation and zero (0: blank data) indicative of no dot formation. Forming dots means depositing toner on paper 3 in fine dots. An image is formed on the paper 3 by aggregation of toner (dots) deposited in a punctuate manner. Dots are formed in such sizes that 600 or 1200 dots are arranged within one inch, for example.

In the present embodiment, line data are defined as data for one line arranged in a main scanning direction (the axial direction of the photosensitive drum 49) in halftone data where dot data and/or blank data are arranged in a two-dimensional matrix shape.

(3) Adjustments of Line Data

Figure 2:
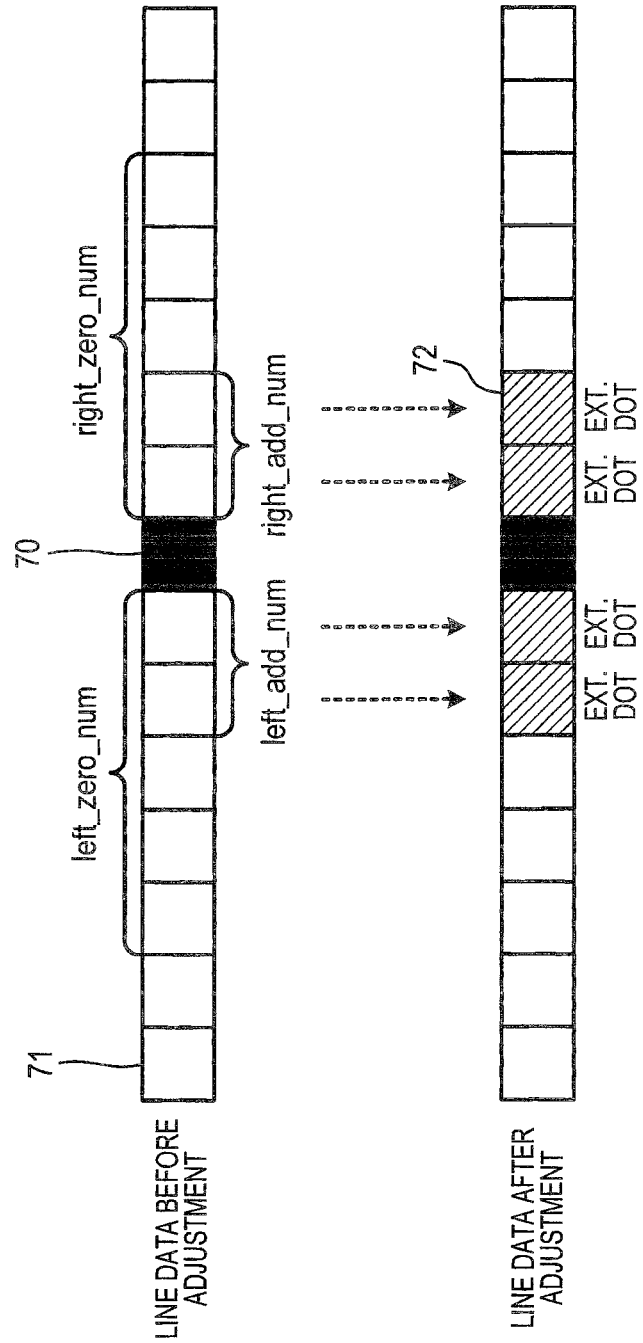
FIG. 2 is an explanatory diagram for explaining adjustments of line data.

In FIG. 2, a filled square 70 indicates dot data (=1), and an unfilled square 71 indicates blank data (=0). Note that, in FIG. 2, reference numeral 71 is provided to only one of the unfilled squares 71. If right_zero_num (five in this example; an example of X) or more blank data, including blank data adjacent to dot data on the right side thereof, are arranged consecutively, then the printer 1 converts right_add_num (two in this example; an example of Y) blank data, including the adjacent blank data, into dot data, thereby adjusting (correcting) line data. Here, an inequality right_zero_num≧right_add_num≧1 is satisfied.

In FIG. 2, a hatched square 72 indicates dot data converted from blank data. Note that, in FIG. 2, reference numeral 72 is provided to only one of the hatched squares 72. In the present embodiment, the dot data converted from blank data are referred to as extension dots (EXT.DOT).

Similarly, if left_zero_num (five in this example; an example of X) or more blank data, including blank data adjacent to dot data on the left side thereof, are arranged consecutively, then the printer 1 converts left_add_num (two in this example; an example of Y) blank data, including the adjacent blank data, into dot data, thereby adjusting line data. Here, an inequality left_zero_num≧left_add_num≧1 is satisfied.

(4) Extension Dot

The printer 1 adjusts one pixel at a time sequentially from a pixel at one end of line data, where one pixel includes eight (8) dot data and/or blank data. Although one pixel includes eight (8) dot data and/or blank data in the present embodiment, it is possible to appropriately set the number of dot data and/or blank data included in one pixel.

When one pixel is adjusted at a time sequentially, extension dots are classified into six types as described below.

(4-1) First Extension Dot

Figure 3A:
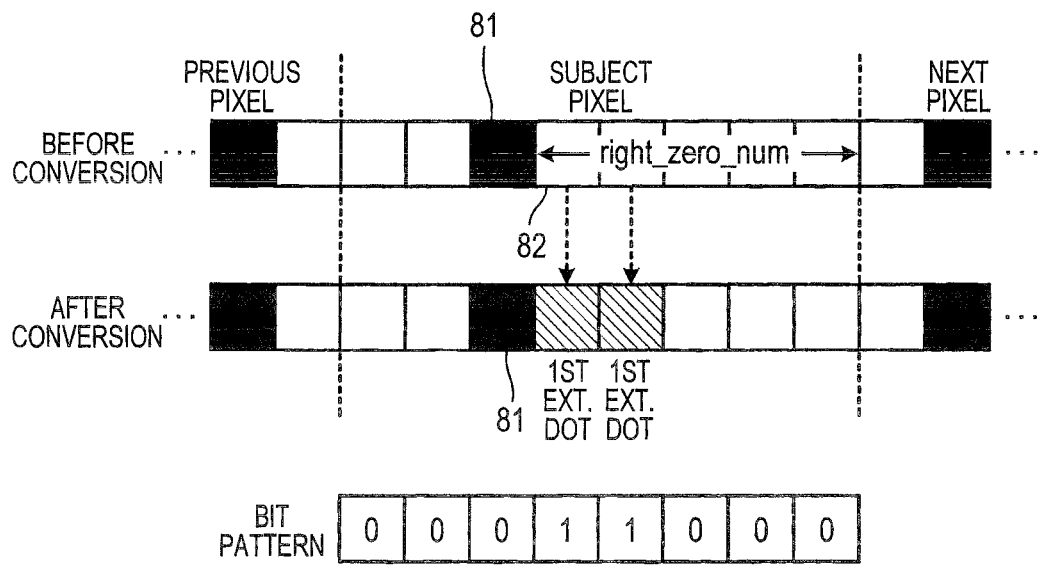
FIG. 3A is an explanatory diagram for explaining a first extension dot.

As shown in FIG. 3A, a first extension dot (1ST EXT.DOT) is dot data that are converted from right_add_num blank data including blank data 82 adjacent to dot data 81 on the next pixel side thereof, in adjustments where the present pixel is a pixel to be adjusted (a subject pixel), the dot data 81 being dot data closest to the next pixel among dot data in the present pixel.

Figure 3B:
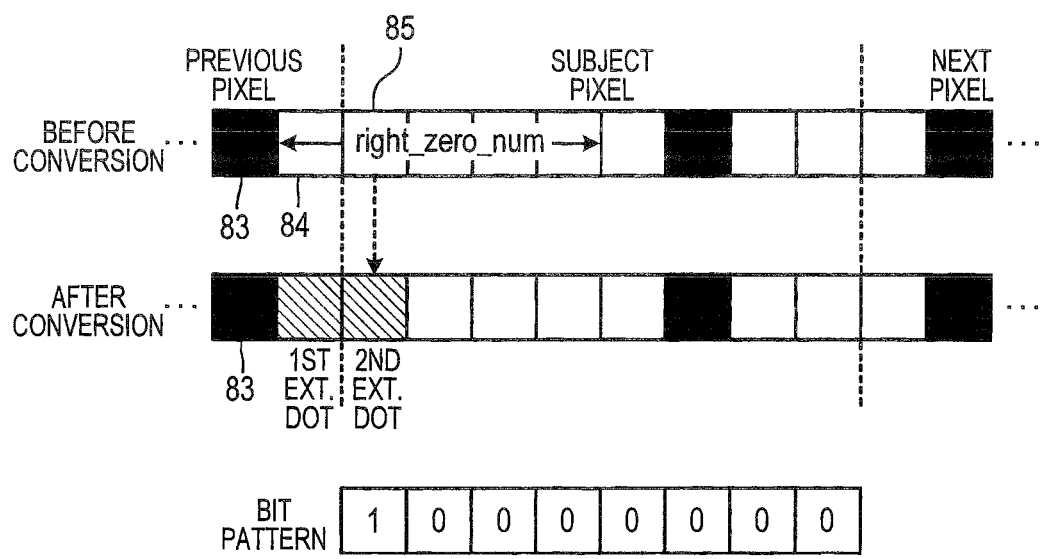
FIG. 3B is an explanatory diagram for explaining a second extension dot.

If there are not right_add_num consecutive blank data, including the adjacent blank data 82, within the present pixel, then all the blank data located within the present pixel and at the next pixel side of dot data closest to the next pixel become the first extension dot (for example, the first extension dot in FIG. 3B).

(4-2) Second Extension Dot

As shown in FIG. 3B, in a previous adjustment where a previous pixel is a subject pixel, if there are not right_add_num consecutive blank data, including blank data 84 adjacent to dot data 83 on the present pixel side thereof, within the previous pixel, then consecutive blank data including blank data 85 in the present pixel and adjacent to the previous pixel (only the blank data 85 in this example) are converted into dot data, the number of the consecutive blank data being right_add_num minus the number of blank data converted into the first extension dots the previous time. Here, the dot data 83 is dot data closest to the present pixel among dot data included in the previous pixel. The dot data converted in this way are referred to as second extension dots (2ND EXT.DOT).

That is, because a part of conversion into dot data could not be done in the previous adjustment where the previous pixel is the subject pixel, the remaining part of the conversion is carried over to the present adjustment so as to convert blank data into dot data, which is the second extension dots.

(4-3) Third Extension Dot

Figure 3C:
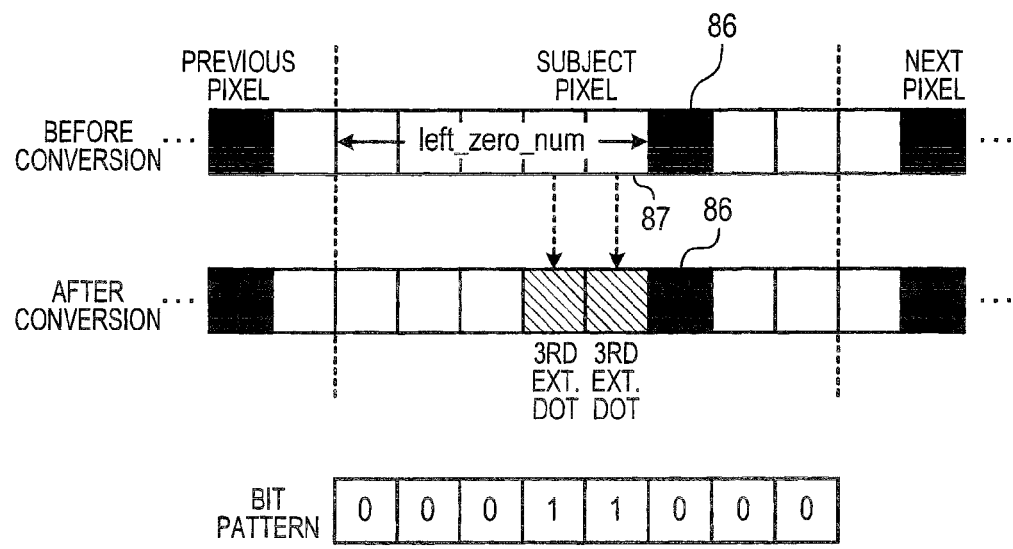
FIG. 3C is an explanatory diagram for explaining a third extension dot.

As shown in FIG. 3C, a third extension dot (3RD EXT.DOT) is dot data that are converted from left_add_num blank data including blank data 87 adjacent to dot data 86 on the previous pixel side thereof, the dot data 86 being dot data closest to the previous pixel among dot data in the present pixel.

Figure 3D:
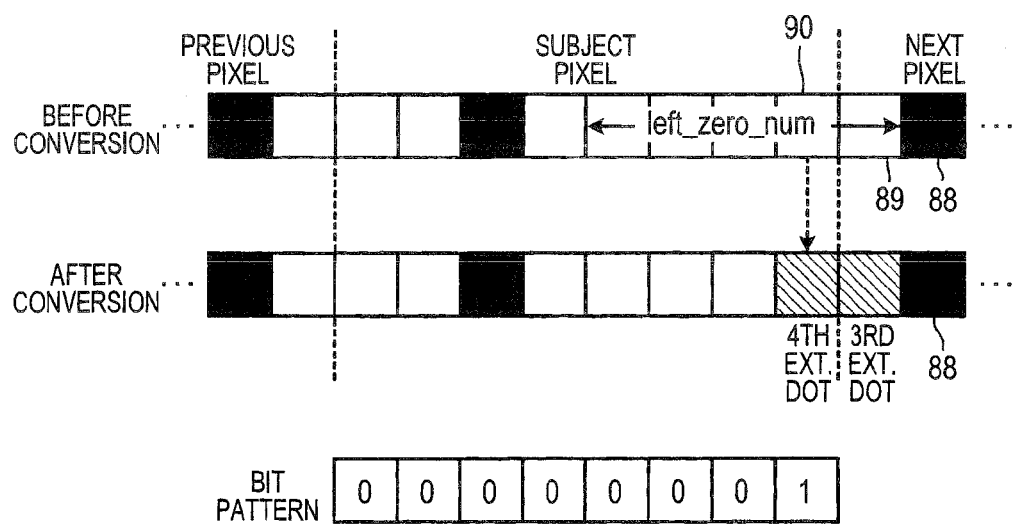
FIG. 3D is an explanatory diagram for explaining a fourth extension dot.

If there are not left_add_num consecutive blank data, including the adjacent blank data 87, within the present pixel, then all the blank data located within the present pixel and at the previous pixel side of dot data closest to the previous pixel become the third extension dot (for example, the third extension dot in FIG. 3D).

(4-4) Fourth Extension Dot

As shown in FIG. 3D, if there are not left_add_num consecutive blank data, including blank data 89 adjacent to dot data 88 on the present pixel side thereof, within the next pixel, then consecutive blank data including blank data 90 in the present pixel and adjacent to the next pixel (only the blank data 90 in this example) are converted into dot data, the number of the consecutive blank data being left_add_num minus the number of blank data converted into the third extension dots the next time. Here, the dot data 88 is dot data closest to the present pixel among dot data included in the next pixel. The dot data converted in this way are referred to as fourth extension dots (4TH EXT.DOT).

That is, because it will be determined in the next adjustment that the blank data 90 in the present pixel need to be converted into dot data, the blank data 90 is preliminary converted into dot data in the present adjustment, which is the fourth extension dot.

(4-5) Fifth Extension Dot

Figure 3E:
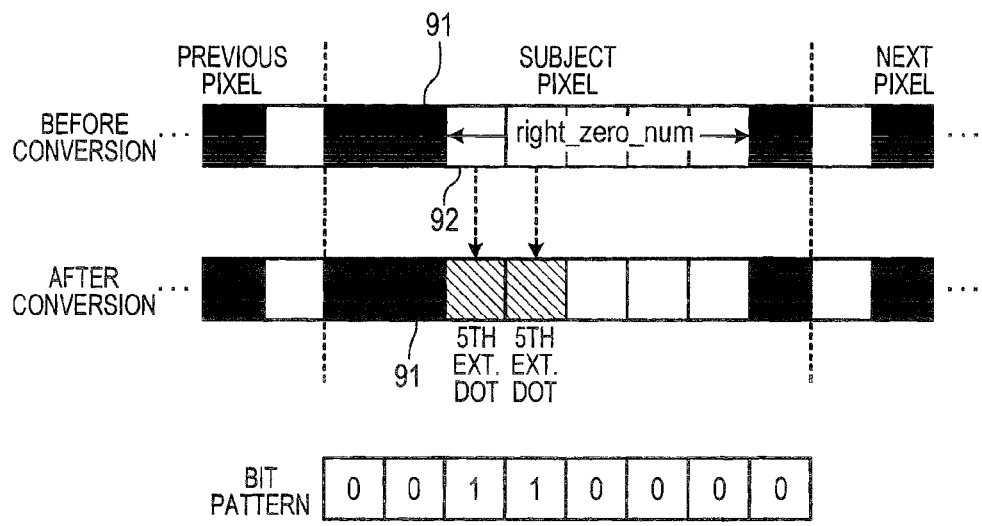
FIG. 3E is an explanatory diagram for explaining a fifth extension dot.

In FIG. 3E, one or more consecutive dot data (including the case of a single dot data) are referred to as one island. If there are two islands within the present pixel in an adjustment where the present pixel is the subject pixel, then right_add_num consecutive blank data, including blank data 92 adjacent to dot data 91 on the next pixel side thereof, are converted into dot data. Here, the dot data 91 is dot data closest to the next pixel among dot data constituting an island closest to the previous pixel. The dot data converted in this way are referred to as fifth extension dots (5TH EXT.DOT).

(4-6) Sixth Extension Dot

Figure 3F:
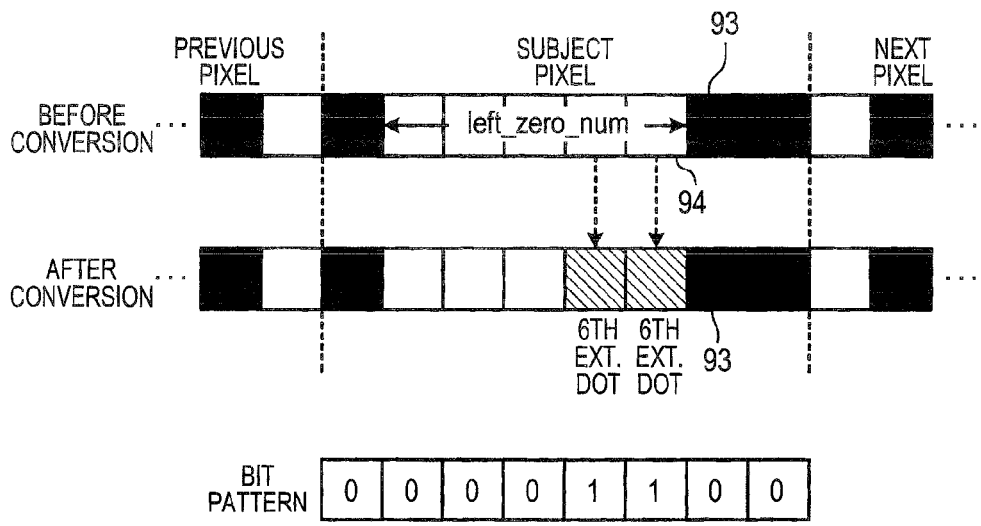
FIG. 3F is an explanatory diagram for explaining a sixth extension dot.

As shown in FIG. 3F, if there are two islands within the present pixel in an adjustment where the present pixel is the subject pixel, then left_add_num consecutive blank data, including blank data 94 adjacent to dot data 93 on the previous pixel side thereof, are converted into dot data. Here, the dot data 93 is dot data closest to the previous pixel among dot data constituting an island closest to the next pixel. The dot data converted in this way are referred to as sixth extension dots (6TH EXT.DOT).

(5) Controller

As shown in FIG. 4, the controller 53 is configured as an ASIC, and includes an extracting section 53*a*, an SRAM 53*b*, a data input section 53*c*, an adjusting section 53*d*, and a data output section 53*e*.

The extracting section 53*a* is a circuit that extracts (decompresses) compressed line data. Halftone data transmitted from the external device and stored in the RAM 12 are outputted to the extracting section 53*a* one line at a time by a DMA controller (not shown). The extracting section 53*a* extracts the outputted line data and outputs to the SRAM 53*b*.

The data input section 53*c* is a circuit that reads out line data from the SRAM 53*b* and that outputs one pixel, at each clock, to the adjusting section 53*d*. Clock is acquired from a clock generator (not shown) provided in the printer 1.

The adjusting section 53*d* is a circuit that adjusts pixels outputted from the data input section 53*c* so as to facilitate adhesion of toner on paper 3.

The data output section 53*e* is a circuit that, when the adjusting section 53*d* outputs pixels for one line (line data after adjustment), outputs the outputted line data to the laser emitting section 54 as video signals. The data output section 53*e* outputs video signals to the laser emitting section 54 in synchronization with timing at which laser light deflected by the polygon mirror 45 is detected by a light receiving sensor (not shown). The laser emitting section 54 turns on and off a laser diode (not shown) based on the video signals. By this operation, an electrostatic latent image for one line is formed on the surface of the photosensitive drum 49.

(6) Configuration of Adjusting Section

Figure 5:
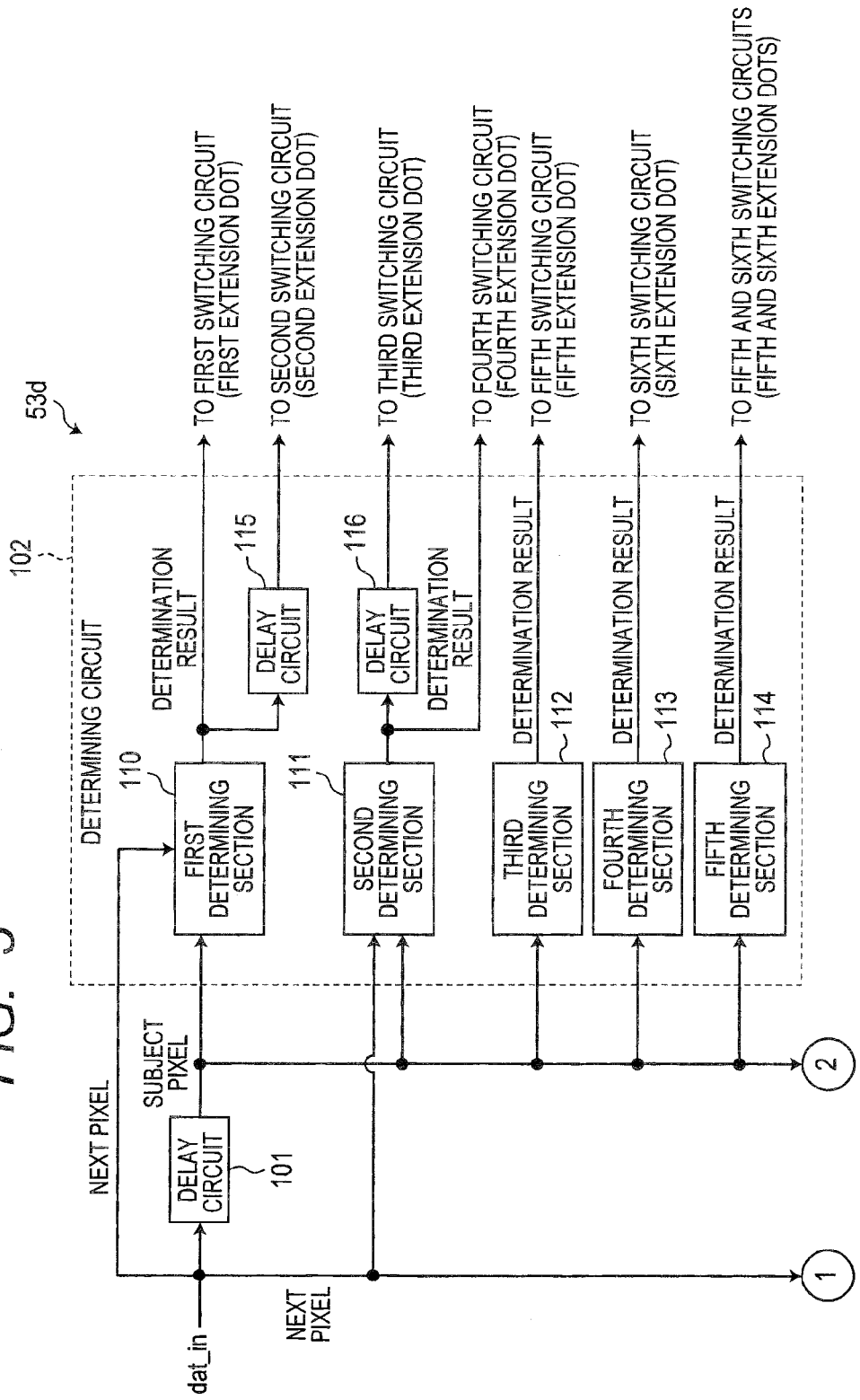
FIG. 5 is a part of a block diagram showing the configuration of an adjusting section.
Figure 6:
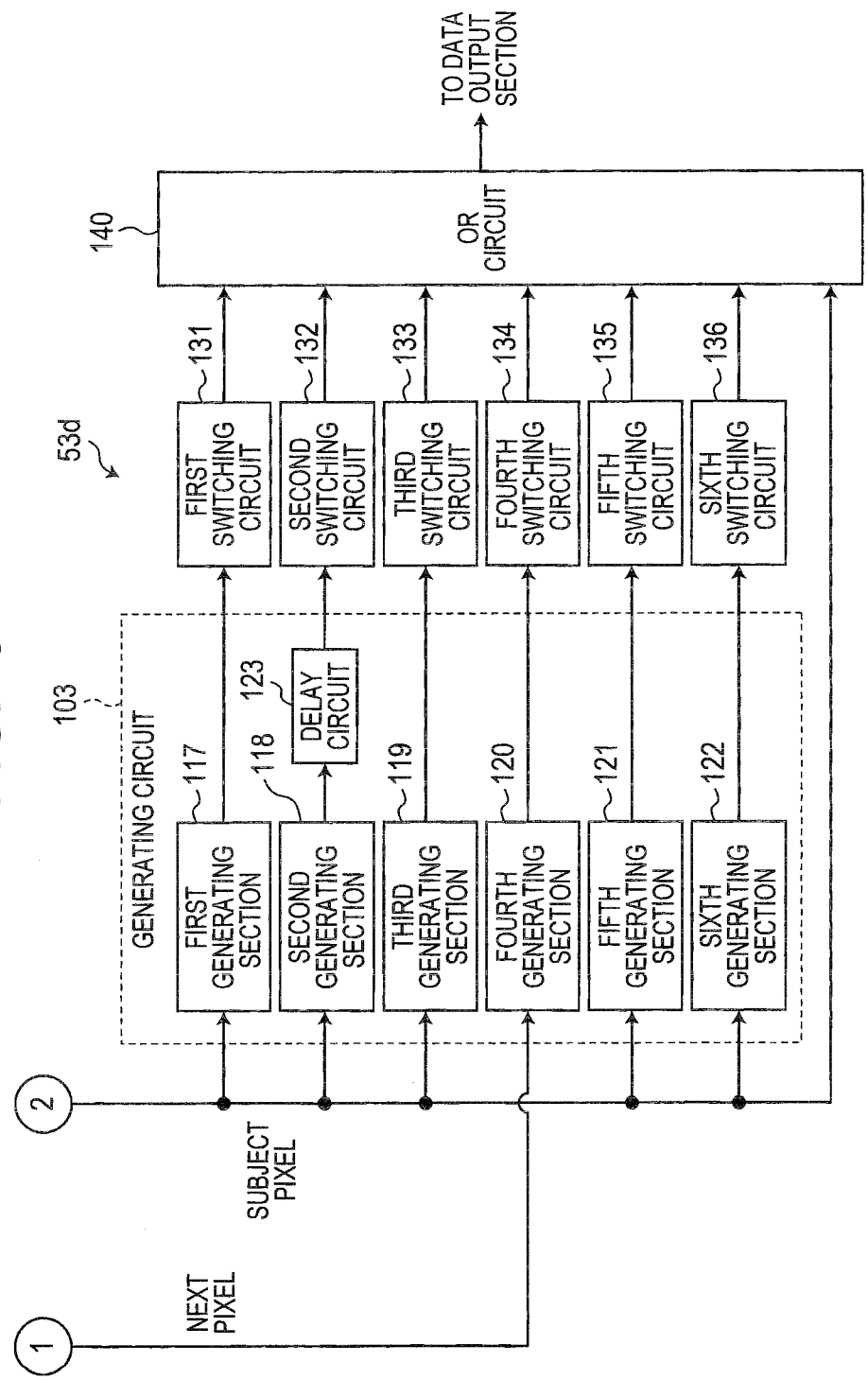
FIG. 6 is another part of the block diagram showing the configuration of the adjusting section.

As shown in FIGS. 5 and 6, the adjusting section 53*d* includes a delay circuit 101 (one example of a storage section), a determining circuit 102 (one example of a determining section), a generating circuit 103 (one example of a converting section), a plurality of switching circuits 131 through 136 (one example of the converting section), and an OR circuit 140 (one example of the converting section). The plurality of switching circuits 131 through 136 include a first switching circuit 131, a second switching circuit 132, a third switching circuit 133, a fourth switching circuit 134, a fifth switching circuit 135, and a sixth switching circuit 136. In FIG. 5, "dat_in" indicates one pixel that is outputted to the adjusting section 53*d*.

(6-1) Delay Circuit

The delay circuit 101 shown in FIG. 5 is a circuit that delays a pixel outputted from the data input section 53*c* by one clock, and that outputs the pixel to the determining circuit 102, the generating circuit 103, and the OR circuit 140 as a subject pixel.

(6-2) Determining Circuit

The determining circuit 102 includes a first determining section 110, a second determining section 111, a third determining section 112, a fourth determining section 113, a fifth determining section 114, a delay circuit 115, and a delay circuit 116. The delay circuit 101 outputs a subject pixel to the first determining section 110 through the fifth determining section 114. Further, next pixel outputted from the data input section 53c (a pixel subsequent to the pixel kept in the delay circuit 101) is also outputted to the first determining section 110 and the second determining section 111.

The first determining section 110 is a circuit that determines whether to convert blank data in the subject pixel into first extension dots and whether to convert blank data in the next pixel into second extension dots. The first determining section 110 determines whether the number of blank data is greater than or equal to right_zero_num, the blank data being located between: dot data closest to the next pixel among dot data included in the subject pixel; and dot data closest to the subject pixel among dot data included in the next pixel. The first determining section 110 then outputs the determination result (YES/NO) to the first switching circuit 131 and to the delay circuit 115.

The determination result outputted to the delay circuit 115 is outputted to the second switching circuit 132 while being delayed one clock by the delay circuit 115. The reason why the determination result of the first determining section 110 is outputted to the second switching circuit 132 while being delayed one clock is that the determination result is used in the next adjustment where the next pixel is the subject pixel.

The second determining section 111 is a circuit that determines whether to convert blank data in the next pixel into third extension dots and whether to convert blank data in the subject pixel into fourth extension dots. The second determining section 111 determines whether the number of blank data is greater than or equal to left_zero_num, the blank data being located between: dot data closest to the next pixel among dot data included in the subject pixel; and dot data closest to the subject pixel among dot data included in the next pixel. The second determining section 111 then outputs the determination result (YES/NO) to the delay circuit 116 and to the fourth switching circuit 134.

The determination result outputted to the delay circuit 116 is outputted to the third switching circuit 133 while being delayed one clock by the delay circuit 116. The reason why the determination result of the second determining section 111 is outputted to the third switching circuit 133 while being delayed one clock is that the determination result is used in the next adjustment where the next pixel is the subject pixel.

The third determining section 112 is a circuit that determines whether to convert blank data in the subject pixel into fifth extension dots. The third determining section 112 determines whether the number of blank data is greater than or equal to right_zero_num, the blank data being located between: dot data closest to the next pixel among dot data constituting an island closest to the previous pixel and in the subject pixel; and a nearest island at the next pixel side and located in the subject pixel. The third determining section 112 then outputs the determination result (YES/NO) to the fifth switching circuit 135. If the number of islands in the subject pixel is one or zero, then the determination result of the third determining section 112 is NO.

The fourth determining section 113 is a circuit that determines whether to convert blank data in the subject pixel into sixth extension dots. The fourth determining section 113 determines whether the number of blank data is greater than or equal to left_zero_num, the blank data being located between: dot data closest to the previous pixel among dot data constituting an island closest to the next pixel and in the subject pixel; and a nearest island at the previous pixel side and located in the subject pixel. The fourth determining section 113 then outputs the determination result (YES/NO) to the sixth switching circuit 136. If the number of islands in the subject pixel is one or zero, then the determination result of the fourth determining section 113 is NO.

The fifth determining section 114 is a circuit that determines whether the number of islands in the subject pixel is less than or equal to two, and that outputs the determination result (YES/NO) to the fifth switching circuit 135 and to the sixth switching circuit 136. The reason why the number of islands is determined is that, if the number of islands is greater than or equal to three, blank data in the subject pixel are prohibited from being converted into a fifth extension dot or a sixth extension dot in this embodiment.

Figure 7:
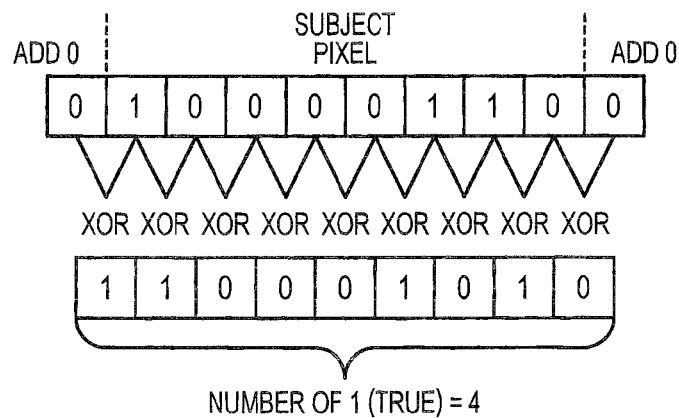
FIG. 7 is an explanatory diagram for explaining determination of the number of islands performed by a fifth determining section.

As shown in FIG. 7, the fifth determining section 114 extends the subject pixel to 10 bits by adding 0 (blank data) to each of the front and the rear of the subject pixel, calculates exclusive OR (XOR) of bits adjacent to each other in the extended subject pixel (extended pixel), and determines that the number of islands is less than or equal to two if the number of 1 (TRUE) is less than or equal to four (an example of a certain number). In the case where the number of bits in one pixel is eight, and 0 (blank data) is added to each of the front and the rear of the pixel, if the number of islands is two, then the number of TRUE is always four. Hence, it can be determined that the number of islands is less than or equal to two if the number of TRUE is less than or equal to four.

(6-3) Generating Circuit

The generating circuit 103 shown in FIG. 6 is a circuit that generates bit patterns described below, in parallel with determination by the determining circuit 102. The generating circuit 103 includes a first generating section 117, a second generating section 118, a third generating section 119, a fourth generating section 120, a fifth generating section 121, a sixth generating section 122, and a delay circuit 123.

Figure 8:
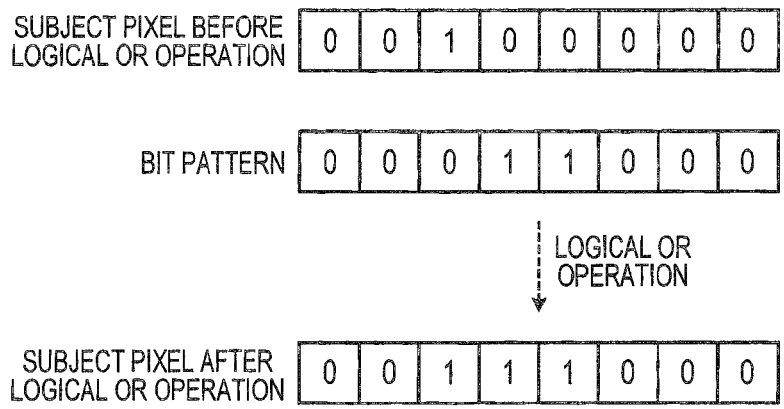
FIG. 8 is an explanatory diagram for explaining a bit pattern.

As shown in FIG. 8, a bit pattern is a bit array having the same number of bits as a subject pixel. In a bit pattern, blank data to be converted into dot data are represented by "1", and the other data (dot data, and blank data not to be converted into dot data) are represented as "0" in the subject pixel.

The first generating section 117 is a circuit that generates a bit pattern for converting blank data in the subject pixel into first extension dots. The first generating section 117 generates a bit pattern (see FIG. 3A, for example) for converting, into first extension dots, right_add_num consecutive blank data including blank data adjacent to dot data on the next pixel side thereof, the dot data being dot data closest to the next pixel among dot data in the subject pixel.

If the number of blank data located within the subject pixel and at the next pixel side of dot data closest to the next pixel is less than right_add_num, then the first generating section 117 generates a bit pattern for converting, into first extension dots, all the blank data located within the subject pixel and at the next pixel side of dot data closest to the next pixel. Here, "all the blank data located within the subject pixel and at the next pixel side of dot data closest to the next pixel" correspond to blank data 84 in FIG. 3B.

The second generating section 118 is a circuit that generates a bit pattern for converting blank data in the next pixel into second extension dots. The second generating section 118 counts the number of blank data located within the subject pixel and at the next pixel side of dot data closest to the next pixel. The second generating section 118 then generates a bit pattern (see FIG. 3B, for example) for converting, into second extension dots, [right_add_num−the counted number] consecutive blank data including blank data located in the next pixel and adjacent to the subject pixel.

The bit pattern generated by the second generating section 118 is outputted to the delay circuit 123, and is further outputted to the second switching circuit 132 while being delayed one clock. The reason why the bit pattern generated by the second generating section 118 is outputted to the second switching circuit 132 while being delayed one clock is that the bit pattern generated by the second generating section 118 is a bit pattern to be applied to the next pixel. And, whether to apply the bit pattern to the next pixel at the next adjustment where the next pixel is the subject pixel is determined by the determination result that is outputted to the delay circuit 115 at the present adjustment.

The third generating section 119 is a circuit that generates a bit pattern for converting blank data in the subject pixel into third extension dots. The third generating section 119 generates a bit pattern (see FIG. 3C, for example) for converting, into third extension dots, left_add_num consecutive blank data including blank data adjacent to dot data on the previous pixel side thereof, the dot data being dot data closest to the previous pixel among dot data in the subject pixel.

If the number of blank data located within the subject pixel and at the previous pixel side of dot data closest to the previous pixel is less than left_add_num, then the third generating section 119 generates a bit pattern for converting, into third extension dots, all the blank data located within the subject pixel and at the previous pixel side of dot data closest to the previous pixel. Here, "all the blank data located within the subject pixel and at the previous pixel side of dot data closest to the previous pixel" correspond to blank data 89 in FIG. 3D.

Here, the bit pattern for converting blank data into third extension dots is a bit pattern that is applied to the present subject pixel. However, whether to apply the bit pattern to the present subject pixel is determined by the determination result that was outputted to the delay circuit 116 at the previous adjustment where the previous pixel is the subject pixel. That is, for the bit pattern for converting blank data into third extension dots, timing of determination and timing of generation are shifted by one clock.

The fourth generating section 120 is a circuit that generates a bit pattern for converting blank data in the subject pixel into fourth extension dots. As shown in FIG. 6, the next pixel, not the subject pixel, is outputted to the fourth generating section 120. This is because the bit pattern for converting blank data in the subject pixel into fourth extension dots can be generated only from the next pixel. The fourth generating section 120 counts the number of blank data located within the next pixel and at the subject pixel side of dot data closest to the subject pixel. The fourth generating section 120 then generates a bit pattern (see FIG. 3D, for example) for converting, into fourth extension dots, [left_add_num−the counted number] consecutive blank data including blank data located in the subject pixel and adjacent to the next pixel.

The fifth generating section 121 is a circuit that generates a bit pattern for converting blank data in the subject pixel into fifth extension dots. The fifth generating section 121 generates a bit pattern (see FIG. 3E, for example) for converting, into fifth extension dots, right_add_num consecutive blank data including blank data adjacent to dot data on the next pixel side thereof, the dot data being dot data closest to the next pixel among dot data constituting an island in the subject pixel and closest to the previous pixel.

The sixth generating section 122 is a circuit that generates a bit pattern for converting blank data in the subject pixel into sixth extension dots. The sixth generating section 122 generates a bit pattern (see FIG. 3F, for example) for converting, into sixth extension dots, left_add_num consecutive blank data including blank data adjacent to dot data on the previous pixel side thereof, the dot data being dot data closest to the previous pixel among dot data constituting an island in the subject pixel and closest to the next pixel.

(6-4) Switching Circuit

The first switching circuit 131 through the sixth switching circuit 136 are circuits that switch whether to output each bit pattern generated in the generating circuit 103 to the OR circuit 140, based on the determination result by the determining circuit 102.

The first switching circuit 131 is a circuit that outputs the bit pattern outputted from the first generating section 117 (the bit pattern for conversion into first extension dots) to the OR circuit 140 if the determination result outputted from the first determining section 110 is "YES", and that outputs no bit pattern if the determination result is "NO".

The second switching circuit 132 is a circuit that outputs the bit pattern outputted from the delay circuit 123 (the bit pattern for conversion into second extension dots) to the OR circuit 140 if the determination result outputted from the delay circuit 115 is "YES", and that outputs no bit pattern if the determination result is "NO". The second switching circuit 132 switches outputting of the bit pattern based on the determination result outputted from the delay circuit 115. Hence, whether to output the bit pattern outputted from the delay circuit 123 to the OR circuit 140 is determined by the previous determination where the previous pixel is the subject pixel.

The third switching circuit 133 is a circuit that outputs the bit pattern outputted from the third generating section 119 (the bit pattern for conversion into third extension dots) to the OR circuit 140 if the determination result outputted from the delay circuit 116 is "YES", and that outputs no bit pattern if the determination result is "NO". The third switching circuit 133 switches outputting of the bit pattern based on the determination result outputted from the delay circuit 116. Hence, whether to output the bit pattern generated by the third generating section 119 to the OR circuit 140 is determined by the previous determination where the previous pixel is the subject pixel.

The fourth switching circuit 134 is a circuit that outputs the bit pattern outputted from the fourth generating section 120 (the bit pattern for conversion into fourth extension dots) to the OR circuit 140 if the determination result outputted from the second determining section 111 is "YES", and that outputs no bit pattern if the determination result is "NO".

The fifth switching circuit 135 is a circuit that outputs the bit pattern outputted from the fifth generating section 121 (the bit pattern for conversion into fifth extension dots) to the OR circuit 140 if both of the determination result outputted from the third determining section 112 and the determination result outputted from the fifth determining section 114 are "YES", and that outputs no bit pattern if at least one of the determination results is "NO".

The sixth switching circuit 136 is a circuit that outputs the bit pattern outputted from the sixth generating section 122 (the bit pattern for conversion into sixth extension dots) to the OR circuit 140 if both of the determination result outputted from the fourth determining section 113 and the determination result outputted from the fifth determining section 114 are "YES", and that outputs no bit pattern if at least one of the determination results is "NO".

(6-5) OR Circuit

As shown in FIG. 8, the OR circuit 140 is a circuit that performs logical OR operations between the subject pixel and the bit patterns. For example, first, a logical OR operation is performed between the subject pixel and the bit pattern outputted from the first switching circuit 131. Then, another logical OR operation is performed between the subject pixel, in which blank data have been converted into dot data by the first logical OR operation, and the bit pattern outputted from the second switching circuit 132. In this way, the logical OR operations are performed between: the operation result between the subject pixel and the previous bit pattern; and the next bit pattern.

(7) Operation of Adjusting Section

Next, an operation of the adjusting section 53d for each clock will be described. In the present embodiment, the external device transmits, to the printer 1, halftone data as well as setting values of print quality (300 dpi/600 dpi/1200 dpi), right_zero_num, right_add_num, left_zero_num, and left_add_num. These setting values can be set by a user in the external device. Note that these settings can be performed by an operating section (not shown) provided on the printer 1.

The adjusting section 53d adjusts line data only when 1200 dpi (an example of high resolution) is set as the print quality, and does not adjust line data when 300 dpi or 600 dpi (examples of low resolution) is set as the print quality. The values such as right_zero_num transmitted from the external device are outputted to the adjusting section 53d, and the adjusting section 53d makes determinations using the outputted values.

Hereinafter, descriptions will be provided assuming that 1200 dpi (high resolution) is set as the print quality.

As described earlier, the data input section 53c outputs a pixel to the adjusting section 53d at each clock. As shown in FIGS. 5 and 6, the outputted pixel is outputted to the delay circuit 101, the determining circuit 102, the generating circuit 103, and the OR circuit 140.

A pixel outputted first is only kept in the delay circuit 101 as the subject pixel. The determining circuit 102, the generating circuit 103, and the OR circuit 140 discard the pixel outputted first.

At the next clock, the subject pixel kept in the delay circuit 101 is outputted to the determining circuit 102, the generating circuit 103, and the OR circuit 140, and the next pixel outputted from the data input section 53c is outputted to the delay circuit 101, the first determining section 110, the second determining section 111, and the fourth generating section 120. The next pixel outputted to the delay circuit 101 is kept as the subject pixel at the next time.

Each of the first determining section 110 through the fifth determining section 114 makes determination and outputs the determination result to the switching circuits and the delay circuits. In parallel with this, each of the first generating section 117 through the sixth generating section 122 generates a bit pattern and outputs the generated bit pattern to a corresponding switching circuit or delay circuit.

Each of the first switching circuit 131 through the sixth switching circuit 136 outputs the bit pattern outputted from the generating circuit 103 to the OR circuit 140 if the determination result outputted from the determining circuit 102 is YES.

The OR circuit 140 performs logical OR operations between the subject pixel outputted from the delay circuit 101 and the bit patterns outputted from each switching circuit, and outputs, to the data output section 53e, the pixel for which the logical OR operations have been performed.

By repeating the above-described process at each clock, line data are adjusted.

(8) Advantageous Effects of the Embodiment

According to the method of adjusting line data and the image forming apparatus of the above-described first embodiment, blank data adjacent to dot data are converted into dot data. Hence, the number of consecutive dots increases, which facilitates adhesion of toner on the paper 3.

Further, according to this embodiment, if the number of consecutive blank data is less than right_zero_num, then the blank data are not converted into dot data.

Further, if the number of consecutive blank data is greater than or equal to right_zero_num, then right_zero_num blank data at the maximum and no more blank data are converted into dot data. Hence, a substantial change from an original image quality can be suppressed. The same goes for left_zero_num.

Thus, according to the method and the apparatus of this embodiment, line data can be adjusted so as to facilitate adhesion of toner on the paper 3, while suppressing a substantial change from an original image quality.

Note that, in this embodiment, it is preferable that right_add_num be set to a smaller value than right_zero_num. Then, a space can be provided between islands even when line data are adjusted. The same goes for left_add_num and left_zero_num.

Further, according to the method and the apparatus of this embodiment, if blank data are adjacent to dot data on both of one side and another side thereof, then determination is made for blank data on each of the both sides. Hence, blank data on both sides of dot data can be converted into dot data, which further facilitates adhesion of toner on the paper 3.

Further, according to the method and the apparatus of this embodiment, when an adjustment is made at each pixel, if there are not right_add_num blank data within the subject pixel and adjacent to dot data closest to the next pixel on the next pixel side, then blank data are converted into dot data (second extension dots) at the next adjustment where the next pixel is the subject pixel, the number of the blank data being right_add_num minus the number of converted blank data the previous time. As a result, Y (right_add_num) blank data can be converted into dot data.

Further, according to the method and the apparatus of this embodiment, at the time of determination of the present subject pixel, it is determined beforehand whether there are left_zero_num blank data in the next pixel and at the present subject pixel side (determination of third extension dots). When an adjustment is made at each pixel, the previous pixel is required for determination on whether left_zero_num blank data are arranged consecutively at the previous pixel side of dot data closest to the previous pixel among dot data in the subject pixel. According to this embodiment, at the time of determination of the present subject pixel, it is determined beforehand whether left_zero_num blank data are arranged consecutively in the next pixel and at the present subject pixel side. Thus, at the time of the next determination where the next pixel is the subject pixel, it is not necessary to determine whether left_zero_num blank data are arranged consecutively at the previous pixel (the subject pixel at the previous time) side.

Further, according to the method and the apparatus of this embodiment, blank data are converted into dot data (fourth extension dots) beforehand at the present adjustment, the number of the blank data being left_add_num minus the number of blank data to be converted at the next adjustment. When an adjustment is made at each pixel, at the next adjustment where the next pixel is the subject pixel, left_add_num blank data cannot be converted into dot data unless there are left_add_num blank data adjacent to dot data on the previous pixel side, the dot data being located in the next pixel and closest to the present pixel. According to this embodiment, blank data are converted into dot data (fourth extension dots) beforehand at the present adjustment, the number of the blank data being left_add_num minus the number of blank data to be converted at the next adjustment. As a result, left_add_num blank data can be converted into dot data.

Further, according to the method and the apparatus of this embodiment, determination is made based on line data on which an adjustment of the determined pixel is not reflected. Hence, it is not necessary to reflect the result of the adjustment (the result of conversion) on line data each time.

Further, according to the method and the apparatus of this embodiment, if the number of islands is greater than or equal to three, then no blank data are converted into dot data (fifth and sixth extension dots). If the number of islands within one pixel is large, a space between the islands becomes small inevitably. In this case, there is possibility that, by performing adjustments, islands next to each other come closer than a certain degree or become connected, which may cause a substantial change from an original image quality. According to this embodiment, if the number of islands is greater than or equal to a predetermined number, then no blank data are converted into dot data (fifth and sixth extension dots). Thus, a substantial change from an original image quality can be suppressed. Further, according to this embodiment, when determining the number of islands, exclusive OR of data adjacent to each other is calculated, and it is determined that the number of islands is greater than or equal to three if the number of TRUE is greater than a certain number. Hence, the number of islands can be determined with a simple process.

Further, according to the method and the apparatus of this embodiment, the user can change values of right_zero_num, right_add_num, left_zero_num, and left_add_num. Hence, if the user does not like the result of adjustments, these values can be changed so as to obtain an image having quality closer to that desired by the user.

Further, according to the method and the apparatus of this embodiment, no adjustments are performed on line data for forming dots in low resolution. Generally, one dot is larger when dots are formed in low resolution than when dots are formed in high resolution. When dots are large, the dots tend to adhere to paper 3 easily. Hence, no adjustments are performed when dots are formed in low resolution. Thus, dots can be formed on the paper 3 in a shorter period.

<Second Embodiment>

A method of adjusting line data and an image forming apparatus according to a second embodiment of the invention will be described while referring to FIGS. 9 through 11, wherein like parts and components are designated by the same reference numerals to avoid duplicating description.

Figure 9:
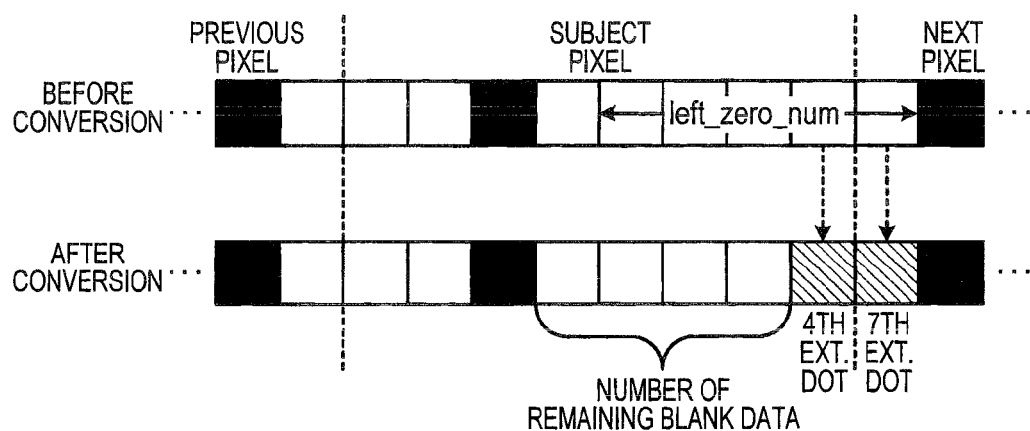
FIG. 9 is an explanatory diagram for explaining adjustments of line data according to a second embodiment.

In FIG. 9, a seventh extension dot is a third extension dot in the next pixel. Because the third extension dot refers to dot data in the present subject pixel, the term "seventh extension dot" is used to differentiate from the third extension dot.

In adjustments of line data according to the second embodiment, it is determined whether the number of remaining blank data is greater than or equal to right_zero_num (=5), the number of remaining blank data being obtained by subtracting the number of seventh extension dots and fourth extension dots from the number of blank data located between dot data included in the subject pixel and closest to the next pixel and dot data included in the next pixel and closest to the subject pixel. If the number of remaining blank data is less than right_zero_num, then the controller 53 neither performs adjustment for converting blank data in the subject pixel into first extension dots nor adjustment for converting blank data in the next pixel into second extension dots.

Figure 10:
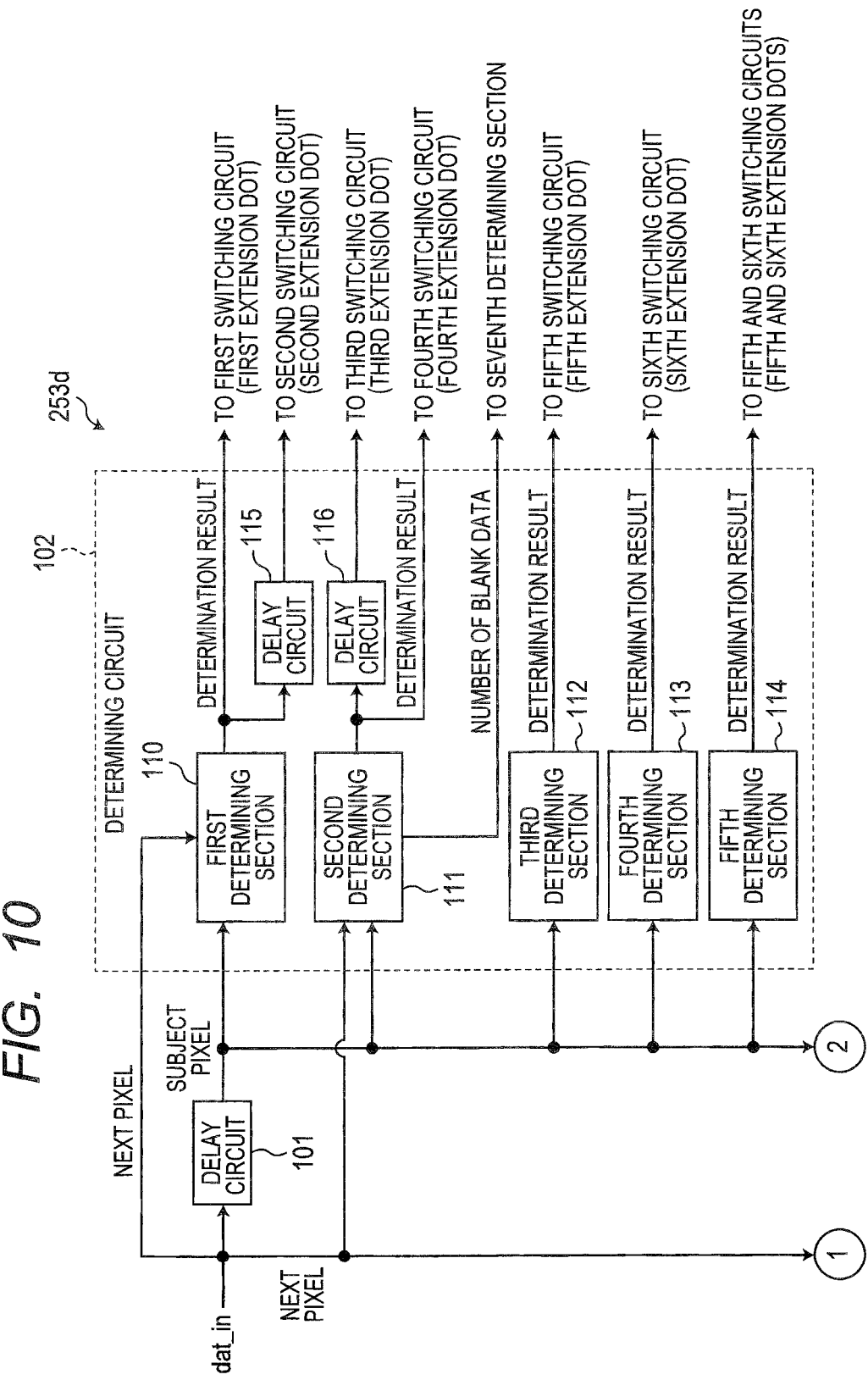
FIG. 10 is a part of a block diagram showing the configuration of an adjusting section according to the second embodiment.

As shown in FIG. 10, the second determining section 111 of the second embodiment outputs the determination result to the delay circuit 116 and to the fourth switching circuit 134, and also outputs, to a seventh determining section 152, the number of blank data located between dot data included in the subject pixel and closest to the next pixel and dot data included in the next pixel and closest to the subject pixel.

Figure 11:
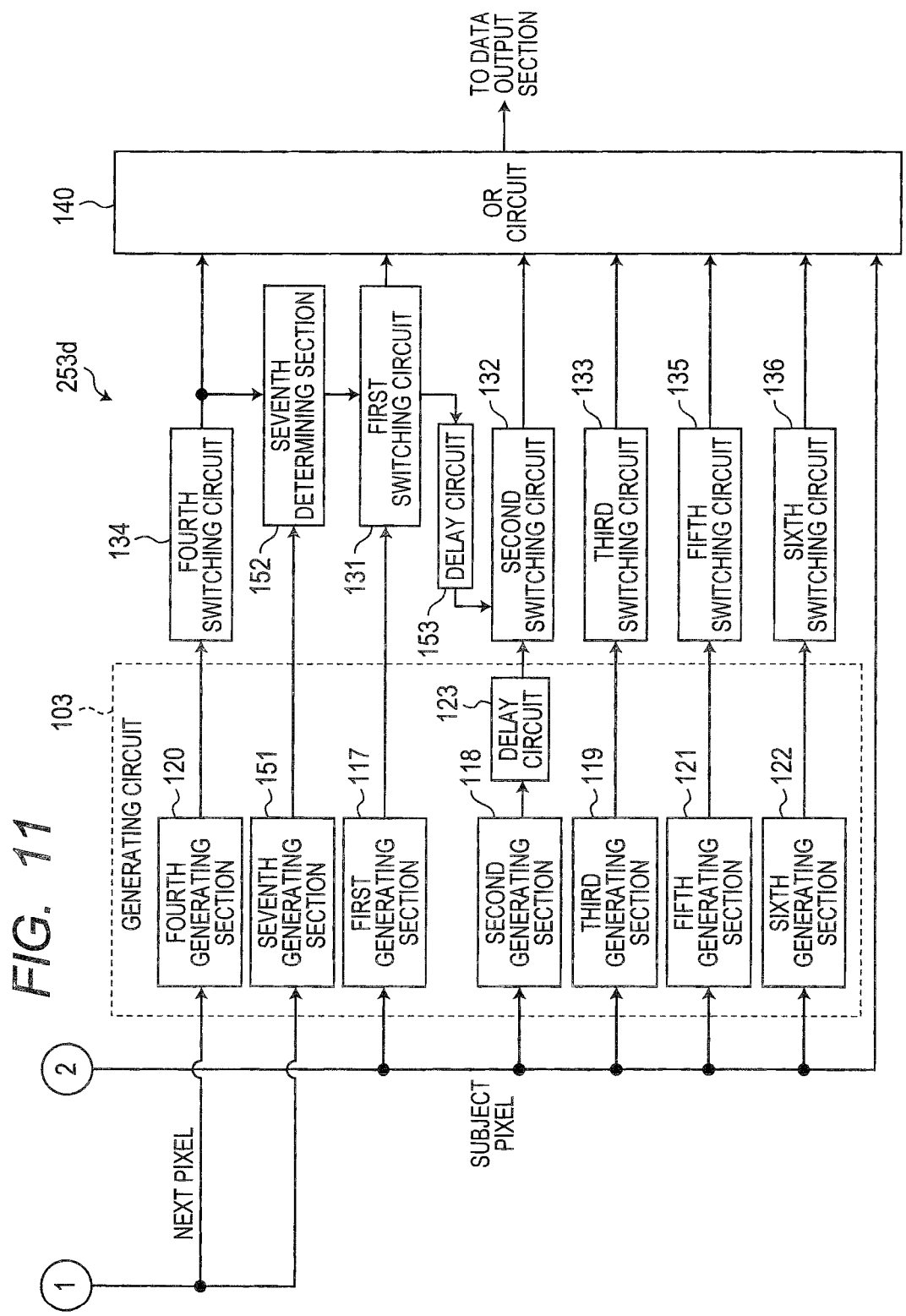
FIG. 11 is another part of the block diagram showing the configuration of the adjusting section according to the second embodiment.

As shown in FIG. 11, an adjusting section 253*d* of the second embodiment includes a seventh generating section 151, the seventh determining section 152, and a delay circuit 153.

The seventh generating section 151 is a circuit that generates a bit pattern for converting, into seventh extension dots, left_add_num consecutive blank data including blank data adjacent to dot data on the subject pixel side thereof, the dot data being included in the next pixel and closest to the subject pixel. The third generating section 119 described above generates a bit pattern for converting blank data in the subject pixel into third extension dots, whereas the seventh generating section 151 generates a bit pattern for converting blank data in the next pixel into seventh extension dots. The both are different in this regard. The bit pattern generated by the seventh generating section 151 is used only for determination, and is discarded after being used for determination.

The seventh determining section 152 is a circuit that obtains the number of fourth extension dots from the bit pattern outputted from the fourth switching circuit 134, that obtains the number of seventh extension dots from the bit pattern outputted from the seventh generating section 151, that determines whether the number of remaining blank data is greater than or equal to right_zero_num, the number of remaining blank data being obtained by subtracting the number of fourth extension dots and the number of seventh extension dots from the number of blank data outputted from the second determining section 111, and that outputs the determination result to the first switching circuit 131. The seventh determining section 152 outputs "YES" to the first switching circuit 131 if the number of remaining blank data is greater than or equal to right_zero_num, and outputs "NO" to the first switching circuit 131 if the number of remaining blank data is less than right_zero_num.

Here, if no bit pattern is outputted (more specifically, if a bit pattern of [00000000] is outputted) from the fourth switching circuit 134, then the number of fourth extension dots is zero.

The first switching circuit 131 of the second embodiment is a circuit that outputs, to the OR circuit 140, the bit pattern outputted from the first generating section 117 (the bit pattern for conversion into first extension dots) if both of the determination result outputted from the first determining section 110 and the determination result outputted from the seventh determining section 152 are "YES", and that outputs no bit pattern if at least one of the determination results is "NO".

Further, the first switching circuit 131 of the second embodiment outputs "YES" to the delay circuit 153 if both of the determination result outputted from the first determining section 110 and the determination result outputted from the seventh determining section 152 are "YES", and outputs "NO" to the delay circuit 153 if at least one of the determination results is "NO".

The second switching circuit 132 of the second embodiment is a circuit that outputs, to the OR circuit 140, the bit pattern outputted from the delay circuit 123 (the bit pattern for conversion into second extension dots) if both of the determination result outputted from the delay circuit 115 and the determination result outputted from the delay circuit 153 are "YES", and that outputs no bit pattern if at least one of the determination results is "NO".

According to the above-described second embodiment, even if the determination result by the first determining section 110 is "YES", if the number of remaining blank data becomes less than right_zero_num as a result of conversion of blank data in the subject pixel into fourth extension dots and conversion of blank data in the next pixel into seventh extension dots (third extension dots in the next pixel), then neither conversion of blank data in the subject pixel into first extension dots nor conversion of blank data in the next pixel into second extension dots is performed. This suppresses a disadvantage that an island including dot data closest to the next pixel among dot data included in the subject pixel and an island including dot data closest to the subject pixel among dot data included in the next pixel become closer than a certain degree or become connected, which may cause a substantial change from an original image quality.

Note that, although descriptions are provided for the case where the left-side blank data are prioritized, the right-side blank data may be prioritized. Or, whether the left-side blank data are prioritized or the right-side blank data are prioritized may be switched alternately for each line data.

Further, the controller 53 may be so configured that, if no conversion is performed from blank data in the next pixel into third extension dots (if the number of blank data is less than left_zero_num), then the bit pattern generated in the seventh generating section 151 is not outputted to the seventh determining section 152. If the bit pattern generated in the seventh generating section 151 is not outputted to the seventh determining section 152, then the number of seventh extension dots is set to zero.

<Third Embodiment>

A method of adjusting line data and an image forming apparatus according to a third embodiment of the invention will be described while referring to FIG. 12, wherein like parts and components are designated by the same reference numerals to avoid duplicating description.

In the above-described embodiments, descriptions are provided for the cases where adjustments of line data are performed by the printer 1. In the third embodiment, adjustments of line data are performed by a computer that executes a printer driver.

As shown in FIG. 12, a computer 2 (hereinafter referred to as "PC"; an example of a processing device) according to the third embodiment includes a CPU 210, a ROM 211, a RAM 212, a storage section 213, a display driving circuit 214, a USB interface 215 (USB I/F), a network interface 216 (NW I/F), and the like.

The CPU 210 controls each section of the PC 2 by executing various programs stored in the ROM 211 and the storage section 213. The ROM 211 stores various programs, data, etc. executed by the CPU 210. The RAM 212 is used as a main storage device for the CPU 210 to execute various processes.

The storage section 213 is an external storage device that stores various programs and data by using nonvolatile storage media such as a hard disk drive and a flash memory. The storage section 213 stores an operating system (OS), application programs such as a word processing program and a spreadsheet program, a printer driver program, and the like.

The display driving circuit 214 is a circuit that drives a display device 220 (a CRT, a liquid crystal display, or the like), and is connected to the display device 220 via a cable. The USB interface 215 is a USB (Universal Serial Bus) host interface, for example, and is connected to devices such as an input device 221 (a mouse, a keyboard, and the like) via a USB cable. The network interface 216 is connected to a laser printer 300 via a communication network 4 such as LAN and Internet.

The laser printer 300 is an apparatus that forms images on a recording medium such as paper by the electro-photographic method. In the third embodiment, descriptions are provided for the laser printer 300 that performs printing by using toner in four colors of C (cyan), M (magenta), Y (yellow), and K (black), as an example. Note that the laser printer 300 may be connected to the PC 2 via the USB interface 215.

When a user selects print in a menu displayed by an application program, the application program outputs a print command for printing a print page to the printer driver program via the OS.

The CPU 210 executing the printer driver program (hereinafter, simply referred to as "printer driver") generates raster data represented by an RGB color space in the RAM 212 by performing a rasterizing process based on the print command outputted from the application program, and converts the raster data into a CMYK color space. Next, the printer driver generates halftone data for each color based on the raster data represented by CMYK color space, and performs adjustments of line data for each line of the generated halftone data for each color. The adjusted line data are transmitted to the laser printer 300 through the OS.

<Modifications>

While the invention has been described in detail with reference to the above aspects thereof, it would be apparent to those skilled in the art that various changes and modifications may be made therein without departing from the scope of the claims.

(1) For example, in the above-described embodiments, blank data on both of one side and another side of dot data are converted into dot data. However, blank data on either one of the both sides of dot data may be converted into dot data.

(2) In the above-described embodiments, the values of right_zero_num and left_zero_num are identical. However, these values may be different from each other. The some goes for the values of right_add_num and left_add_num.

(3) In the above-described embodiments, the number of dot data constituting an island is not considered during adjustments. However, the number of dot data constituting an island may be considered. Specifically, one example is that, if the number of dot data constituting an island is small, then blank data adjacent to the island are converted into dot data, and if the number of dot data constituting an island is large, then blank data are not converted into dot data.

What is claimed is:

1. A method of adjusting line data, the method being performed by a processing device that processes image data for forming dots of toner on a recording medium, based on line data representing a dot pattern for one line by dot data indicative of dot formation and blank data indicative of no dot formation, the method comprising:

determining whether X or more blank data are arranged consecutively, the X or more blank data including adjacent blank data adjacent to dot data on at least one side of the dot data, where X is an integer greater than one ($X \geq 1$); and converting Y blank data including the adjacent blank data into dot data if it is determined that the X or more blank data are arranged consecutively in the determining step, where Y is an integer greater than or equal to one and less than or equal to X ($X \geq Y \geq 1$), wherein when Y is greater than one, the Y blank data are consecutive blank data, wherein adjustments are performed for each pixel that includes a predetermined number of consecutive data, each of the consecutive data being one of dot data and blank data, the method further comprising:

acquiring consecutive data for one pixel from the line data sequentially, each of the consecutive data being one of dot data and blank data; and storing the consecutive data for one pixel in a storage section as a subject pixel, wherein the determining step further includes determining whether X or more blank data are arranged consecutively on a next pixel side of next-side dot data based on a present subject pixel and on a next pixel acquired in the acquiring step, the next-side dot data being closest to the next pixel among dot data in the present subject pixel; and wherein the converting step further includes, if it is determined in the determining step that the X or more blank data are arranged consecutively, converting, into dot data, Y blank data including next-side blank data in the present subject pixel and adjacent to the next-side dot data on the next pixel side thereof.

2. The method according to claim 1, wherein, in the determining step, if blank data are adjacent to dot data on both of one side and another side of the dot data, determination is made for blank data on each of the both sides.

3. The method according to claim 1, wherein the determining step further includes determining whether Y or more blank data are arranged, within the present subject pixel, on the next pixel side of the next-side dot data if it is determined in the determining step that the X or more blank data are arranged consecutively, wherein when Y is greater than one, the Y or more blank data are consecutive blank data;

wherein the converting step further includes, if it is determined that the Y or more blank data are arranged within the present subject pixel, converting Y blank data on the next pixel side of the next-side dot data into first dot data.

4. The method according to claim 1, wherein the determining step further includes determining whether Y or more blank data are arranged, within the present subject pixel, on the next pixel side of the next-side dot data if it is determined in the determining step that the X or more blank data are arranged consecutively, wherein when Y is greater than one, the Y or more blank data are consecutive blank data; and wherein the converting step further includes, if it is determined that the Y or more blank data are not arranged within the present subject pixel, converting all blank data on the next pixel side of the next-side dot data within the present subject pixel into first dot data and, at next conversion where the next pixel is a subject pixel, converting, into second dot data, conversion blank data including present-side blank data in the next pixel and adjacent to the present subject pixel, a number of the conversion blank data being Y minus a number of the all blank data converted into the first dot data, wherein when a number of the conversion blank data is greater than one, the conversion blank data are consecutive blank data.

5. The method according to claim 1, wherein adjustments are performed for each pixel that includes a predetermined number of consecutive data, each of the consecutive data being one of dot data and blank data, the method further comprising:

acquiring consecutive data for one pixel from the line data sequentially, each of the consecutive data being one of dot data and blank data, wherein the determining step further includes determining based on the line data for which conversion of determined pixel in the converting step is not reflected.

6. The method according to claim 1, wherein an island is defined as one or more consecutive dot data, and blank data are arranged between one island and another island; and wherein, as a result that the blank data adjacent to the one island on another island side are converted into dot data, if the blank data adjacent to the another island on one island side are converted to dot data which causes the one island and the another island to become closer than a certain degree or to become connected, then the blank data adjacent to the another island are not converted into dot data.

7. The method according to claim 1, wherein adjustments are performed for each pixel that includes a predetermined number of consecutive data, each of the consecutive data being one of dot data and blank data, the method further comprising:

acquiring consecutive data for one pixel from the line data sequentially, each of the consecutive data being one of dot data and blank data;

adding blank data to front and rear of the consecutive data for the pixel acquired in the acquiring step, thereby obtaining an extended pixel;

calculating exclusive OR of data adjacent to each other in the extended pixel; and prohibiting the adjustments from being performed if a number of TRUE included in a result of the calculating step is greater than a certain number.

8. The method according to claim 1, further comprising changing at least one of X and Y.

9. The method according to claim 1, wherein the line data includes high-resolution line data for forming dots in high resolution and low-resolution line data for forming dots in low resolution; and wherein no adjustments are performed for the low-resolution line data.

10. A method of adjusting line data, the method being performed by a processing device that processes image data for forming dots of toner on a recording medium, based on line data representing a dot pattern for one line by dot data indicative of dot formation and blank data indicative of no dot formation, the method comprising:

determining whether X or more blank data are arranged consecutively, the X or more blank data including adjacent blank data adjacent to dot data on at least one side of the dot data, where X is an integer greater than one ($X>1$); and converting Y blank data including the adjacent blank data into dot data if it is determined that the X or more blank data are arranged consecutively in the determining step, where Y is an integer greater than or equal to one and less than or equal to X ($X \geq Y \geq 1$), wherein when Y is greater than one, the Y blank data are consecutive blank data, wherein adjustments are performed for each pixel that includes a predetermined number of consecutive data, each of the consecutive data being one of dot data and blank data, the method further comprising:

acquiring consecutive data for one pixel from the line data sequentially, each of the consecutive data being one of dot data and blank data; and storing the consecutive data for one pixel in a storage section as a subject pixel, wherein the determining step further includes determining whether X or more blank data are arranged consecutively on a present subject pixel side of present-side dot data based on a present subject pixel and on a next pixel acquired in the acquiring step, the present-side dot data being closest to the present subject pixel among dot data in the next pixel; and wherein the converting step further includes, if it is determined in the determining step that the X or more blank data are arranged consecutively, at next conversion where the next pixel is a subject pixel, converting, into dot data, Y blank data including present-side blank data in the next pixel and adjacent to the present-side dot data on the present subject pixel side thereof.

11. The method according to claim 10, wherein the determining step further includes determining whether Y or more blank data are arranged, within the next pixel, on the present subject pixel side of the present-side dot data if it is determined in the determining step that the X or more blank data are arranged consecutively, wherein when Y is greater than one, the Y or more blank data are consecutive blank data; and wherein the converting step further includes, if it is determined that the Y or more blank data are arranged within the next pixel, at the next conversion, converting Y blank data on the present subject pixel side of the present-side dot data into third dot data.

12. The method according to claim 10, wherein the determining step further includes determining whether Y or more blank data are arranged, within the next pixel, on the present subject pixel side of the present-side dot data if it is determined in the determining step that the X or more blank data are arranged consecutively, wherein when Y is greater than one, the Y or more blank data are consecutive blank data; and wherein the converting step further includes, if it is determined that the Y or more blank data are not arranged within the next pixel, converting, into fourth dot data, conversion blank data including next-side blank data in the present subject pixel and adjacent to the next pixel, a number of the conversion blank data being Y minus a number of blank data to be converted into third dot data and, at the next conversion, converting all blank data on the present subject pixel side of the present-side dot data into the third dot data, wherein when a number of the conversion blank data is greater than one, the conversion blank data are consecutive blank data.

13. An image forming apparatus that forms dots of toner on a recording medium, based on line data representing a dot pattern for one line by dot data indicative of dot formation and blank data indicative of no dot formation, comprising:

a determining section that determines whether X or more blank data are arranged consecutively, the X or more blank data including adjacent blank data adjacent to dot data on at least one side of the dot data, where X is an integer greater than one ($X \geq 1$); and a converting section that converts Y blank data including the adjacent blank data into dot data if the determining section determines that the X or more blank data are arranged consecutively, where Y is an integer greater than or equal to one and less than or equal to X ($X \geq Y \geq 1$), wherein when Y is greater than one, the Y blank data are consecutive blank data, wherein adjustments are performed for each pixel that includes a predetermined number of consecutive data, each of the consecutive data being one of dot data and blank data, the apparatus further comprising:

an acquiring section that acquires consecutive data for one pixel from the line data sequentially, each of the consecutive data being one of dot data and blank data; and a storage section that stores the consecutive data for one pixel as a subject pixel, wherein the determining section determines whether X or more blank data are arranged consecutively on a next pixel side of next-side dot data based on a present subject pixel and on a next pixel acquired by the acquiring section, the next-side dot data being closest to the next pixel among dot data in the present subject pixel; and wherein, if the determining section determines that the X or more blank data are arranged consecutively, the converting section converts, into dot data, Y blank data including next-side blank data in the present subject pixel and adjacent to the next-side dot data on the next pixel side thereof.

14. The image forming apparatus according to claim 13, wherein, in the determining section, if blank data are adjacent to dot data on both of one side and another side of the dot data, determination is made for blank data on each of the both sides.

15. The image forming apparatus according to claim 13, wherein an island is defined as one or more consecutive dot data, and blank data are arranged between one island and another island; and wherein, if the determining section determines that, as a result that the blank data adjacent to the one island on another island side are converted into dot data, if the blank data adjacent to the another island on one island side are converted to dot data which causes the one island and the another island to become closer than a certain degree or to become connected, then the converting section does not convert the blank data adjacent to the another island into dot data.

16. The image forming apparatus according to claim 13, wherein adjustments are performed for each pixel that includes a predetermined number of consecutive data, each of the consecutive data being one of dot data and blank data, the apparatus further comprising:

an acquiring section that acquires consecutive data for one pixel from the line data sequentially, each of the consecutive data being one of dot data and blank data, wherein the determining section adds blank data to front and rear of the consecutive data for the pixel acquired by the acquiring section, thereby obtaining an extended pixel, calculates exclusive OR of data adjacent to each other in the extended pixel; and prohibits the adjustments from being performed if a number of TRUE included in a calculated result is greater than a certain number.

17. An image forming apparatus that forms dots of toner on a recording medium, based on line data representing a dot pattern for one line by dot data indicative of dot formation and blank data indicative of no dot formation, comprising:

a determining section that determines whether X or more blank data are arranged consecutively, the X or more blank data including adjacent blank data adjacent to dot data on at least one side of the dot data, where X is an integer greater than one ($X > 1$); and a converting section that converts Y blank data including the adjacent blank data into dot data if the determining section determines that the X or more blank data are arranged consecutively, where Y is an integer greater than or equal to one and less than or equal to X ($X \geq Y \geq 1$), wherein when Y is greater than one, the Y blank data are consecutive blank data, wherein adjustments are performed for each pixel that includes a predetermined number of consecutive data, each of the consecutive data being one of dot data and blank data, the apparatus further comprising:

an acquiring section that acquires consecutive data for one pixel from the line data sequentially, each of the consecutive data being one of dot data and blank data; and a storage section that stores the consecutive data for one pixel as a subject pixel, wherein the determining section determines whether X or more blank data are arranged consecutively on a present subject pixel side of present-side dot data based on a present subject pixel and on a next pixel acquired by the acquiring section, the present-side dot data being closest to the present subject pixel among dot data in the next pixel; and wherein, if the determining section determines that the X or more blank data are arranged consecutively, at next conversion where the next pixel is a subject pixel, the converting section converts, into dot data, Y blank data including present-side blank data in the next pixel and adjacent to the present-side dot data on the present subject pixel side thereof.

18. A method of adjusting line data, the method being performed by a processing device that processes image data for forming dots of toner on a recording medium, based on line data representing a dot pattern for one line by dot data indicative of dot formation and blank data indicative of no dot formation, the method comprising:

determining whether one blank data is arranged adjacent to dot data on at least one side of the dot data, the one blank data being adjacent blank data; and converting the adjacent blank data into dot data if it is determined that the one blank data is arranged adjacent to the dot data in the determining step, wherein an island is defined as one or more consecutive dot data, and blank data are arranged between one island and another island; and wherein, as a result that the blank data adjacent to the one island on another island side are converted into dot data, if the blank data adjacent to the another island on one island side are converted to dot data which causes the one island and the another island to become closer that a certain degree or to become connected, then the blank data adjacent to the another island are not converted into dot data.

19. A method of adjusting line data, the method being performed by a processing device that processes image data for forming dots of toner on a recording medium, based on line data representing a dot pattern for one line by dot data indicative of dot formation and blank data indicative of no dot formation, the method comprising:

determining whether one blank data is arrange adjacent to dot data on at least one side of the dot data, the one blank data being adjacent blank data; and converting the adjacent blank data into dot data if it is determined that the one blank data is arranged adjacent to the dot data in the determining step, wherein adjustments are performed for each pixel that includes a predetermined number of consecutive data, each of the consecutive data being one of dot data and blank data, the method further comprising:

acquiring consecutive data for one pixel from the line data sequentially, each of the consecutive data being one dot data and blank data;

adding blank data to front and rear of the consecutive data for the pixel acquired in the acquiring step, thereby obtaining an extended pixel;

calculating exclusive OR of data adjacent to each other in the extended pixel; and prohibiting the adjustments from being performed if a number of TRUE included in a result of the calculating step is greater than a certain number.

\* \* \* \* \*